United States Patent
Kaneko et al.

(10) Patent No.: US 10,052,953 B2
(45) Date of Patent: Aug. 21, 2018

(54) INFORMATION PROVISION APPARATUS FOR VEHICLE

(71) Applicant: Nippon Seiki Co., Ltd., Niigata (JP)

(72) Inventors: Hiroaki Kaneko, Niigata (JP); Hiroki Kirino, Niigata (JP); Yasuyuki Fujitsuka, Niigata (JP); Yuki Ishizuki, Niigata (JP); Yoshiyuki Nogami, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 0 days.

(21) Appl. No.: 15/114,322

(22) PCT Filed: Feb. 23, 2015

(86) PCT No.: PCT/JP2015/054924
§ 371 (c)(1),
(2) Date: Jul. 26, 2016

(87) PCT Pub. No.: WO2015/125949
PCT Pub. Date: Aug. 27, 2015

(65) Prior Publication Data
US 2017/0008398 A1    Jan. 12, 2017

(30) Foreign Application Priority Data

Feb. 24, 2014   (JP) .................. 2014-032428
Oct. 8, 2014    (JP) .................. 2014-207334

(51) Int. Cl.
*G01C 21/00*    (2006.01)
*B60K 35/00*    (2006.01)

(52) U.S. Cl.
CPC ...... *B60K 35/00* (2013.01); *B60K 2350/1056* (2013.01); *B60K 2350/1092* (2013.01); *B60K 2350/2043* (2013.01); *Y02T 10/84* (2013.01)

(58) Field of Classification Search
CPC .................................................... B60K 35/00
(Continued)

(56) References Cited

U.S. PATENT DOCUMENTS

2006/0079182 A1    4/2006  Matsuda
2011/0143726 A1*   6/2011  de Silva ............ G01C 21/3688
                                                            455/414.1

(Continued)

FOREIGN PATENT DOCUMENTS

JP    2006-126071 A    5/2006
JP    2006-148864 A    6/2006
(Continued)

OTHER PUBLICATIONS

International Search Report issued in International Application No. PCT/JP2015/054924, dated Apr. 21, 2015, with English Translation.

*Primary Examiner* — Brent Swarthout
(74) *Attorney, Agent, or Firm* — McDermott Will & Emery LLP (57) ABSTRACT

Provided is an information provision apparatus for a vehicle, the apparatus capable of providing information that fits the situation of the vehicle to a user. An information provision apparatus for a vehicle is provided with a vehicle-mounted device which comprises a report means for reporting various kinds of information including vehicle information to a user, and a control means for operating the report means, and is connected to an external device via a connection means. Upon receiving a manipulation input signal indicating that a start switch of the vehicle is turned on, the control means operates the report means in order to report to the user that a communication connection between the vehicle-mounted device and the external device is not established, until the communication connection is established.

6 Claims, 7 Drawing Sheets

(58) Field of Classification Search
USPC .................................. 340/461, 438, 425.5
See application file for complete search history.

(56) References Cited

U.S. PATENT DOCUMENTS

| | | | | |
|---|---|---|---|---|
| 2013/0219098 | A1* | 8/2013 | Turnpenny | H04M 1/04 710/303 |
| 2014/0244712 | A1* | 8/2014 | Walters | H04L 67/10 709/202 |
| 2014/0379920 | A1* | 12/2014 | Nathwani | H04W 4/04 709/226 |
| 2015/0212106 | A1* | 7/2015 | Henderson | B60K 35/00 701/1 |
| 2016/0003621 | A1* | 1/2016 | Koenig | G01C 21/00 701/31.4 |

FOREIGN PATENT DOCUMENTS

| | | |
|---|---|---|
| JP | 2008-124776 A | 5/2008 |
| JP | 2008-271400 A | 11/2008 |
| JP | 2009-145158 A | 7/2009 |

\* cited by examiner

INFORMATION PROVISION APPARATUS FOR VEHICLE

RELATED APPLICATIONS

This application is the U.S. National Phase under 35 U.S.C. § 371 of International Application No. PCT/JP2015/054924, filed on Feb. 23, 2016, which in turn claims the benefit of Japanese Application No. 2014-032428, filed on Feb. 24, 2014 and Japanese Application No. 2014-207334, filed on Oct. 8, 2014, the disclosures of which Applications are incorporated by reference herein.

TECHNICAL FIELD

The present invention relates to an information provision apparatus for a vehicle mounted on, for example, various vehicles including motorcycles and automobiles.

BACKGROUND ART

Traditionally, regarding this kind of information provision apparatus for a vehicle, an information provision apparatus for a vehicle described in, for example, PTL 1 below has been known. The information provision apparatus for a vehicle described in PTL 1 is provided with a vehicle-mounted device including a display unit for displaying prescribed information to a driver (a user of the vehicle) and a control means for operating the display unit, a portable navigation unit which is an external device configured to be connected to the display unit (the vehicle-mounted device) via a connection means and to be portable by the driver, and a connection discrimination means for discriminating whether the portable navigation unit is connected to the display unit. The connection means is constituted by a first communication unit provided in the vehicle-mounted device and a second communication unit provided in the portable navigation unit.

The control means is configured such that, when it is discriminated by the connection discrimination means that the portable navigation unit is connected to the display unit, navigation data (route guide information) output from the portable navigation unit is sent to the vehicle-mounted device via the first and second communication units, and is displayed on the display unit under the control of the control means.

CITATION LIST

Patent Literature

Patent Literature 1: JP-A No. 2009-145158

SUMMARY OF THE INVENTION

Problems to be Solved by the Invention

Meanwhile, in the information provision apparatus for a vehicle described in PTL 1 , since the first communication unit provided in the vehicle-mounted device is not started until about 10 seconds elapse after the driver turns on a start switch of the vehicle, a phenomenon that the display unit (the vehicle-mounted device) is not connected to the portable navigation unit (the external device) to be communicable with each other occurs.

That is, until about 10 seconds elapse after the start switch is turned on (i.e., until a wireless communication connection is established between the display unit and the portable navigation unit), the navigation data is not able to be displayed on the display unit. Since the display unit remains in a non-display state during this period, it is hard to consider that information that fits the situation of the vehicle is provided to the driver (the user), and there is a room for further improvement. In view of the above-described problems, an object of the present invention is to provide an information provision apparatus for a vehicle capable of providing information that fits a situation of the vehicle to a user.

Means for Solving the Problems

According to an aspect of the present invention, there is provided an information provision apparatus for a vehicle that includes: a vehicle-mounted device including: a report means for reporting various types of information including vehicle information to a user; and a control means for operating the report means, and is connected to an external device via a connection means, wherein upon receiving a manipulation input signal indicating that a start switch of the vehicle is turned on, the control means operates the report means in order to report to the user that a communication connection between the vehicle-mounted device and the external device is not established, until the communication connection is established.

According to another aspect of the present invention, there is provided an information provision apparatus for a vehicle that includes: a vehicle-mounted device including: a report means for reporting various types of information including vehicle information to a user; and a control means for operating the report means, and is connected to an external device via a connection means, wherein the report means includes at least a display portion for displaying the various types of information, and upon receiving a manipulation input signal indicating that a start switch of the vehicle is turned on, the control means makes the various types of information be displayed on the display portion when it is determined that the communication connection between the vehicle-mounted device and the external device is not established, and when it is determined that the communication connection is established, the control means operates the report means to display, at a predetermined position of the display portion, external information of a vehicle sent from the external device via the connection means.

Further, the report means is provided at least with a pointer type display portion which displays the vehicle information, the pointer type display portion is constituted by a pointer extending linearly, and a display plate having a measurement value display portion indicated by the pointer, and the control means operates the report means so that the user can know remaining time until the communication connection is established by reading contrast between the pointer and the measurement value display portion.

Further, the report means is constituted by a display portion which displays the various types of information, a translucent member disposed to enclose the display portion and a luminous body supplying illumination light of predetermined color to the translucent member, and the control means turns on the luminous body or makes the luminous body blink in order to report to the user that the communication connection is not established until the communication connection is established.

Further, the report means is constituted by a translucent member disposed to enclose the display portion and a luminous body supplying illumination light of predetermined color to the translucent member, and when it is determined that the communication connection is established, the control means turns on the luminous body or makes the luminous body blink in order to report to the user that the communication connection is established.

Effect of the Invention

According to the present invention, an information provision apparatus for a vehicle capable of fulfilling the object and providing information that fits the situation of the vehicle to a user can be provided.

MODE FOR CARRYING OUT THE INVENTION (First Embodiment)

Hereafter, a first embodiment of the present invention will be described with reference to FIGS. 1 to 6.

Figure 1:
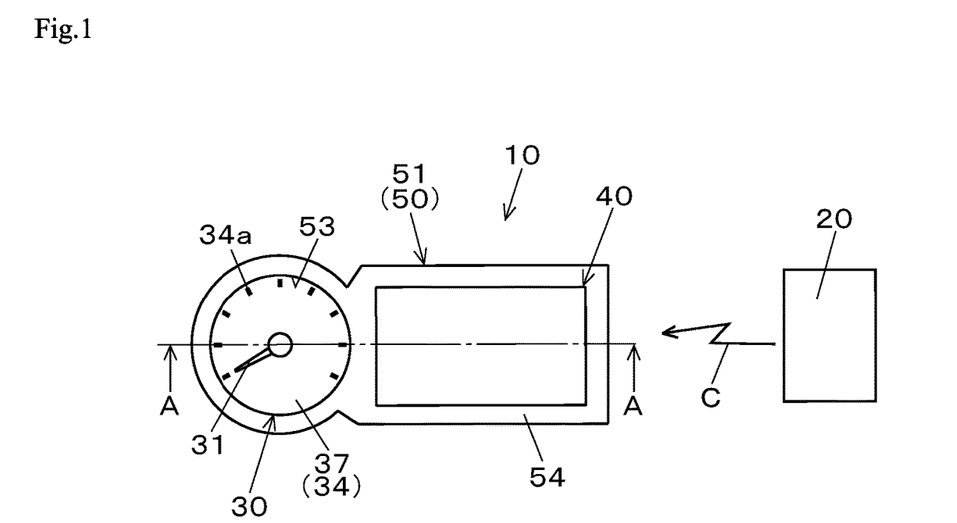
FIG. 1 is a front view of an information provision apparatus for a vehicle according to an embodiment of the present invention.

In FIG. 1, an information provision apparatus for a vehicle according to the present embodiment is provided with a vehicle instrument 10 which is a vehicle-mounted device mounted at the center of a handlebar of a motorcycle, and a portable terminal 20 which is an external device connected to be communicable with the vehicle instrument 10.

The vehicle instrument 10 has a pointer type display portion 30 located on the left side in FIG. 1 and consisting of a rotating meter which displays engine revolutions of a vehicle in an analog manner, a display unit 40 located on the right side in FIG. 1, a housing 50 which constitutes an exterior case of the vehicle instrument 10, and a circuit substrate 60 housed in the housing 50. The pointer type display portion 30 and the display unit 40 are disposed adjacent to each other.

Figure 2:
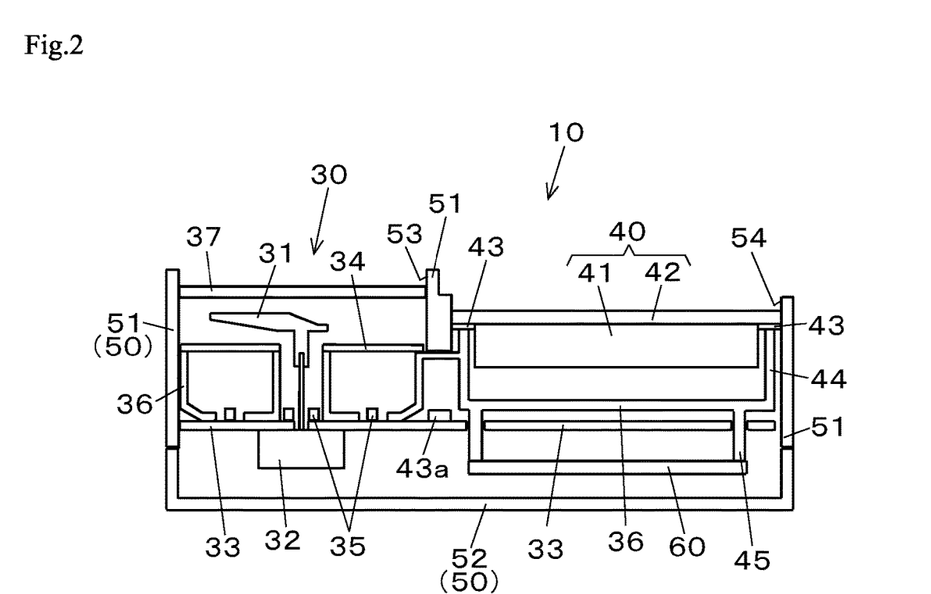
FIG. 2 is a cross-sectional view along line A-A of FIG. 1.

The pointer type display portion 30 which displays engine revolutions (vehicle information) is constituted mainly by a pointer 31 extending linearly as illustrated in FIG. 2, a driving device 32 consisting of an instrument movement which operates the pointer 31, a wiring substrate 33 on which the driving device 32 is mounted to be electrically conducting, and a display plate 34 which is located between the pointer 31 and the wiring substrate 33 and has a measurement value display portion 34a, such as a scale portion, indicated by the pointer 31. A plurality of light emitting elements 35 corresponding to the pointer 31 and the display plate 34 are mounted on the wiring substrate 33 provided on the back side of the display plate 34.

In this case, the pointer 31 is formed by a light transmissive material capable of emitting light upon being irradiated with light when the light emitting elements 35 are turned on, and the measurement value display portion 34a of the display plate 34 (see FIG. 1) is formed by a light transmissive material so as to emit light upon being irradiated with light when the light emitting elements 35 are turned on.

The wiring substrate 33 is formed, for example, by a hard circuit substrate in which an electrically conducting path as a wiring pattern is provided on a glass epoxy base. The driving device 32, the light emitting elements 35, a later-described control means which controls the driving device 32, the light emitting elements 35, and a later-described display device provided in the display unit 40, and various electronic components (not illustrated), such as resistance and a capacitor, are connected to the electrically conducting path to be electrically conducting.

Moreover, a case body 36 formed, for example, by a white-colored synthetic resin material is provided on the front side of the wiring substrate 33. A plurality of illumination rooms which contain the light emitting elements 35 and guide the light of the light emitting elements 35 toward the pointer 31 and the display plate 34 are formed in the case body 36. The case body 36 has a function as a support member holding the display plate 34. The case body 36 fixes and holds not only the display plate 34 but the circuit substrate 60 and a later-described second see-through portion located on the display unit 40 side.

On the front side of the pointer 31 and the display plate 34, a substantially plate-shaped first see-through portion 37 formed by a light transmissive synthetic resin material is provided to cover the pointer 31 and the display plate 34. The first see-through portion 37 is disposed at a later-described first front side opening provided in the housing 50 so that the first see-through portion 37 closes the first front side opening. When riding the motorcycle, the rider (the user of the vehicle) viewing the vehicle instrument 10 can see (visually recognize) the vehicle information through the first see-through portion 37.

The display unit 40 is constituted by a display device 41 consisting of a TFT liquid crystal display panel which displays various types of information including vehicle information and external information of the vehicle except for the vehicle information, and a substantially plate-shaped second see-through portion 42 which covers the front side of the display device 41.

The second see-through portion 42 is formed by a light transmissive synthetic resin material and is disposed to close a later-described second front side opening provided in the housing 50. A non-transmissive portion 43 consisting of, for example, a black-colored printed layer is formed by printing on the periphery of the back side of the second see-through portion 42 except for the position at which the display device 41 is disposed.

In FIG. 2, the reference numeral 44 denotes a holding portion holding the periphery of the second see-through portion 42 on the back side. The holding portion 44 is formed integrally with the case body 36. In FIG. 2, the reference numeral 45 denotes a boss portion provided to fix the circuit substrate 60. The boss portion 45 is formed integrally with the case body 36 as in the case of the holding portion 44, and is formed to penetrate the wiring substrate 33 and extend downward toward the circuit substrate 60. The circuit substrate 60 is attached to the boss portion 45 using a fixing means.

The rider viewing the vehicle instrument 10 can see (visually recognize) various types of information including vehicle information and external information of the vehicle displayed on the display device 41 through the second see-through portion 42. In this case, vehicle information and external information of the vehicle coexist as the information displayed on the display device 41 as described later. If needed, the display device 41 and the second see-through portion 42 may be joined to each other with photocurable transparent resin (not illustrated) consisting of an optical adhesive disposed between the display device 41 and the second see-through portion 42.

The housing 50 is formed, for example, by a black-colored synthetic resin material, and houses the pointer type display portion 30, the display unit 40, and the circuit substrate 60. The housing 50 is divided into an upper housing 51 and a lower housing 52.

On the front side of the upper housing 51, which is one of the housings 51 and 52 located on the rider side, a first front side opening 53 is formed to open at a position corresponding to the pointer 31 and the display plate 34, and a second front side opening 54 is formed to open at a position corresponding to the display device 41. The first see-through portion 37 is disposed at the first front side opening 53 and the second see-through portion 42 is disposed at the second front side opening 54.

The circuit substrate 60 is formed, for example, by a hard circuit substrate in which a predetermined circuit pattern is provided on a glass epoxy base. The circuit substrate 60 is located on the back side of the wiring substrate 33 with a space therebetween (disposed in substantially parallel with the wiring substrate 33). The circuit substrate 60, of which contour shape is smaller than that of the wiring substrate 33, is connected to the wiring substrate 33 using a wiring member (not illustrated).

A later-described first communication unit for performing wireless communication with the portable terminal 20 is formed in the circuit substrate 60. The first communication unit consists of a circuit pattern for an antenna formed by using a conductive material on a back side (one of the sides) of the circuit substrate 60, and is connected to the circuit pattern to be electrically conducting.

Figure 3:
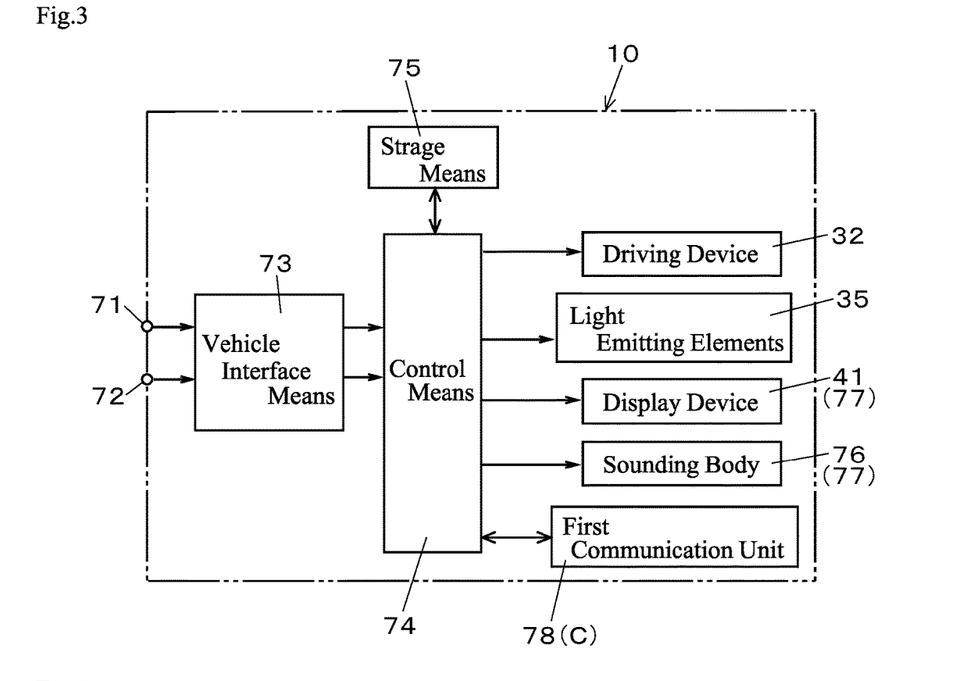
FIG. 3 is a block diagram illustrating an electrical configuration of a vehicle-mounted device according to the embodiment.

FIG. 3 is a block diagram of the vehicle instrument 10. The vehicle instrument 10 is provided with a vehicle information terminal (a vehicle information means) 71 which mainly inputs and outputs each information about various conditions of the vehicle (vehicle situation signals) and a multiplex communication I/O terminal (a multiplex communication I/O means) 72, a vehicle interface (vehicle I/F) means 73, a control means 74 consisting, for example, of a microcomputer which controls the vehicle instrument 10, a storage means 75 consisting of non-volatile memory, such as flash memory and EEPROM, storing a processing program of the control means 74, a report means 77 consisting of the above-described display device 41 as the display portion, such as a liquid crystal display panel, which visually displays (reports) various types of information including vehicle information to the user and a sounding body 76, such as a speaker, which auditorily reports various types of information to the user, the above-described driving device 32 for driving the pointer 31 to rotate, the above-described light emitting elements 35 for making the pointer 31 and the measurement value display portion 34a emit light, and a first communication unit 78 (here, Bluetooth (registered trademark)) as a wireless communication means which constitutes a connecting means C for connecting with the portable terminal 20.

In a case in which the vehicle is a motorcycle as in this example, the sounding body 76 may be a helmet speaker housed in a helmet worn by the rider of the motorcycle.

The portable terminal 20 may be, for example, a smartphone which is put in, for example, a pocket of the clothing of the rider of the motorcycle. Here, it is assumed that both the vehicle instrument 10 and the portable terminal 20 have a short-distance electric wave transmission/reception function.

Figure 4:
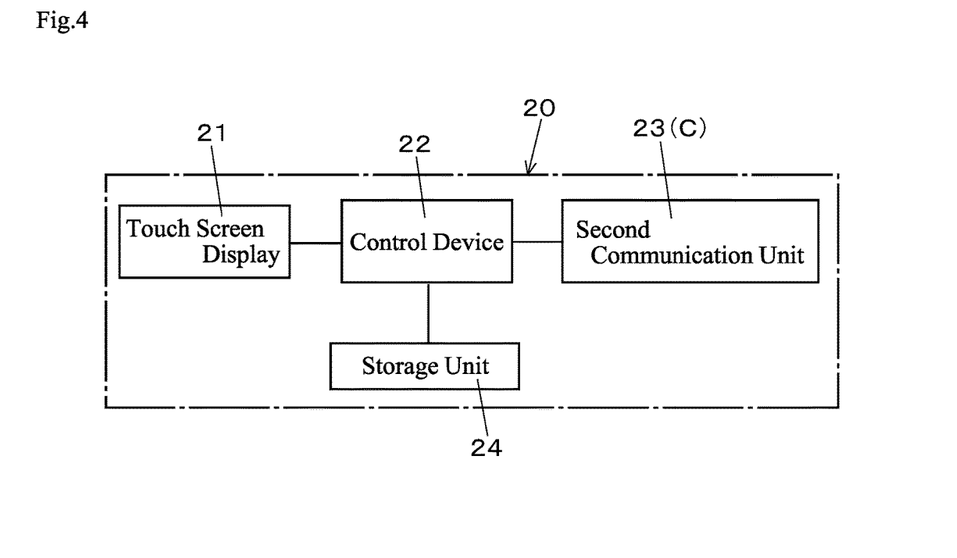
FIG. 4 is a block diagram illustrating an electrical configuration of an external device according to the embodiment.

FIG. 4 is a block diagram of the portable terminal 20. The portable terminal 20 is constituted mainly by a touchscreen display 21 provided with a touch panel which displays predetermined information, a control device 22 including a CPU and the like which controls operations of the touchscreen display 21, a second communication unit 23 (here, Bluetooth (registered trademark)) capable of transmitting and receiving data to and from the first communication unit 78 provided in the vehicle instrument 10, and a storage unit 24 consisting of non-volatile memory, such as flash memory and EEPROM, in which a processing program of the control device 22 is stored.

The touchscreen display 21 is provided on the front side of the portable terminal 20 and, although not illustrated in detail, a resistance film type or electrostatic capacitance type touch panel is disposed on the display area of the liquid crystal display panel. When the rider touches a position on the touch panel corresponding to the display area, the touchscreen display 21 functions as a switch.

Moreover, the second communication unit 23 performs wireless communication with the first communication unit 78 mounted in the vehicle instrument 10, and has a function as a wireless communication means constituting the connecting means C for connecting with the vehicle instrument 10. That is, this means that the vehicle instrument 10 is connected with the portable terminal 20 via the connecting means C (each of the communication units 78 and 23) to be communicable.

Next, a processing operation performed by the control means 74 provided in the vehicle instrument 10 will be described.

Figure 5:
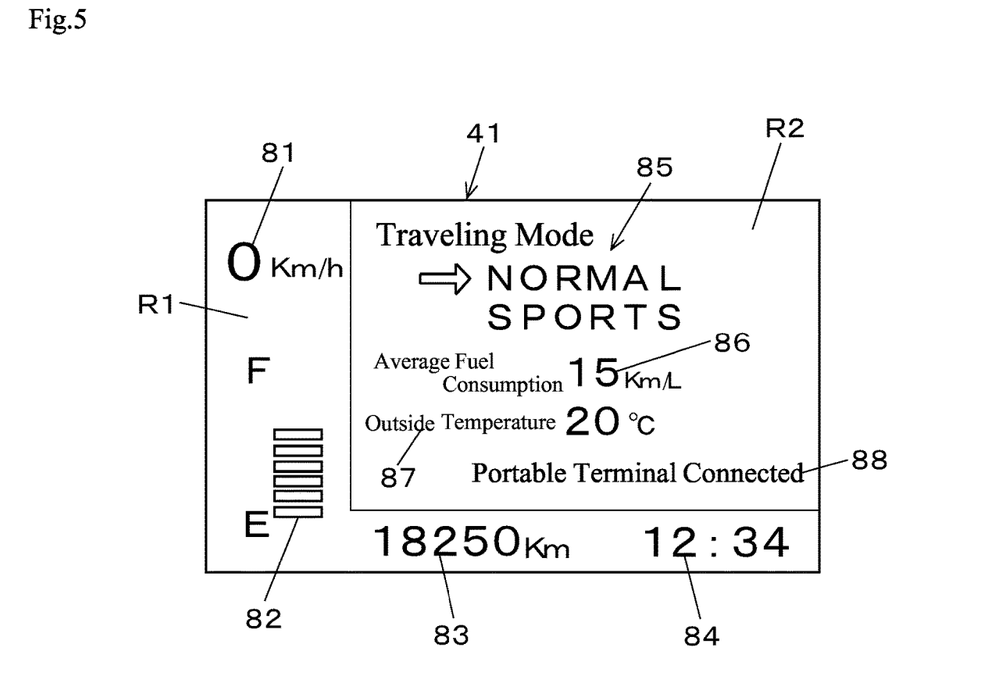
FIG. 5 is a front view of a display portion when a communication connection according to the embodiment is not established.

Upon receiving a manipulation input signal indicating that a start switch of the vehicle is turned on as a manipulation input signal via the multiplex communication I/O terminal 72 (or the vehicle information terminal 71), the control means 74 operates the display device 41 (the report means 77) to display vehicle information (vehicle situation information) as illustrated in FIG. 5 based on the manipulation input signal on the display device 41, and until a communication connection between the vehicle instrument 10 and the portable terminal 20 is established (that is, for about 10 seconds after the start switch is turned on until the first communication unit 78 completes starting), the control means 74 operates the display device 41 (the report means 77) to display in order to report to the rider that the communication connection is not established.

FIG. 5 illustrates an example of display information displayed on the display device 41 when the start switch is turned on but the communication connection is not established (for example, when about 5 seconds elapsed after the start switch is turned on).

In FIG. 5, for example, vehicle information consisting of a vehicle speed display portion 81 displaying a travelling speed of the motorcycle, a residual fuel display portion 82 which is residual fuel information, a mileage display portion 83 displaying an accumulated mileage and the like, a time display portion 84 which is time information displaying current time, a traveling mode display portion 85 displaying a current traveling mode, a fuel mileage display portion 86 which is fuel efficiency information, such as an average fuel mileage, and an ambient temperature display portion 87 which is ambient temperature information is displayed on the display device 41. A "NORMAL" mode, a "SPORTS" mode, and the like are provided as the traveling mode, and the "NORMAL" mode is selected in FIG. 5.

The display information displayed on the display device 41 is classified to be displayed in either of a fixed display area R1 capable of being displayed at a predetermined display position or a variable display area R2 of which display form is variable. In FIG. 5, the fixed display area R1 is provided as a substantially L-shaped area along the left and lower sides of the display device 41, and the variable display area R2 is provided as the area other than the substantially L-shaped area.

Here, the vehicle speed display portion 81, the fuel mileage display portion 82, the mileage display portion 83, and the time display portion 84 are displayed in the fixed display area R1, and other display information, i.e., the traveling mode display portion 85, the fuel mileage display portion 86, and the ambient temperature display portion 87 is displayed in the variable display area R2.

When it is determined that the communication connection is not established (the first communication unit 78 has not started), the above-described control means 74 operates the display device 41 (the report means 77) in order to display to report to the rider that the communication connection is not established. Then, a report portion 88 of "portable terminal connected" is displayed below the ambient temperature display portion 87 in the variable display area R2 of the display device 41.

Any display may be employed as the report portion 88 indicating that the communication connection is not established and, for example, "communication device starting" or "portable terminal not connected" may also be used as the display of the report portion 88.

Since the report portion 88 is thus displayed, the rider can easily know that the portable terminal 20 is not connected by viewing the report portion 88. Therefore, it is possible to provide information that fits the situation of the vehicle to the rider. The report portion 88 may be displayed in red or may blink to improve attention-calling property to the rider.

Figure 6:
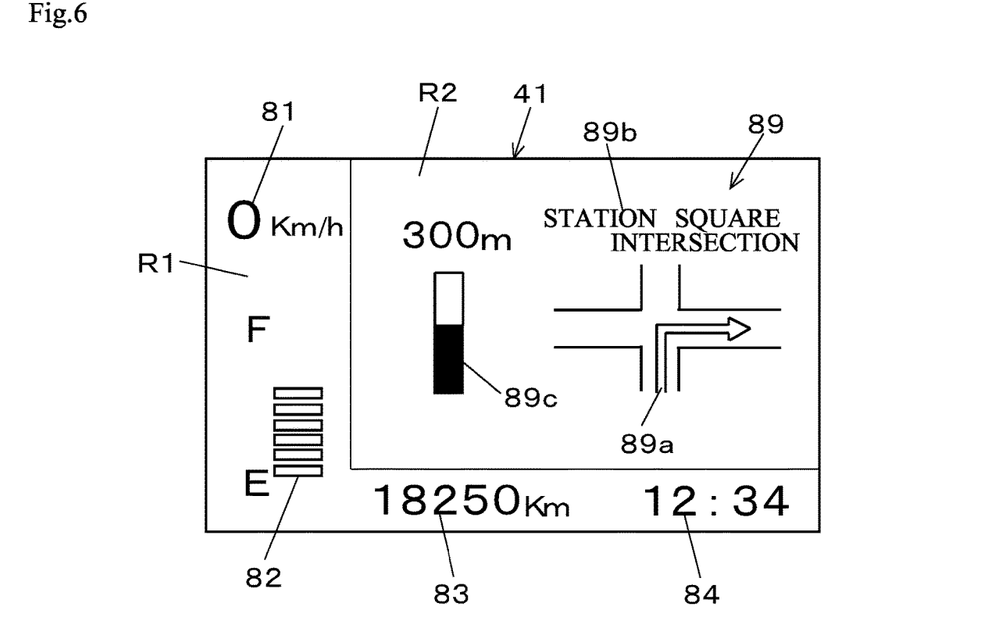
FIG. 6 is a front view of the display portion when a communication connection according to the embodiment is established.

Next, when 10 seconds or more (for example, 20 seconds) elapsed after the start switch is turned on and it is determined that the communication connection is established, the control means 74, at the same time, receives the manipulation input signal via the multiplex communication I/O terminal 72 (or the vehicle information terminal 71), receives external information of the vehicle (here, the navigation information) sent from the portable terminal 20 via each of the communication units 78 and 23, and operates the display device 41 (the report means 77) to display so that the vehicle information and the navigation information as illustrated in FIG. 6 are displayed on the display device 41.

Then, as illustrated in FIG. 6, regarding the information displayed in the fixed display area R1, the vehicle speed display portion 81, the fuel mileage display portion 82, the mileage display portion 83, and the time display portion 84 are continuously displayed regardless of the establishment of the communication connection, whereas regarding the display in the variable display area R2, upon establishment of the communication connection (upon start-up of the first communication unit 78), the display information constituted by the traveling mode display portion 85, the fuel mileage display portion 86, the ambient temperature display portion 87, and the report portion 88 is changed to the navigation display portion 89 which is the navigation information.

The navigation display portion 89 includes, for example, an arrow display 89a, an intersection name display 89b, and a remaining distance to the intersection display 89c. The external information of the vehicle may include not only the navigation information but music information, email arrival information, and the like.

Especially, as the display in the variable display area R2 which is the predetermined position of the display device 41 is changed, the report portion 88 of "portable terminal connected" displayed in the variable display area R2 till then is hidden and, therefore, the rider can know intuitively that the portable terminal 20 is connected to the vehicle instrument 10 via the connecting means C (the first and the second communication units 78 and 23) to be communicable in a wireless manner. Therefore, it is possible to provide information that fits the situation of the vehicle to the rider.

As described above, the present embodiment is provided with the vehicle instrument 10 which includes the report means 77 for reporting various types of information including vehicle information to the rider, and the control means 74 for operating the report means 77, and is connected to the portable terminal 20 via the connecting means C. Upon receiving a manipulation input signal indicating that a start switch of the vehicle is turned on, the control means 74 operates the report means 77 in order to report to the user that a communication connection between the vehicle instrument 10 and the portable terminal 20 is not established, until the communication connection is established.

Therefore, since the report portion 88 of "portable terminal connected" indicating that the communication connection is not established is displayed at a part of the variable display area R2 in the display device 41 (the report means 77), the rider can easily know that the portable terminal 20 is not connected by viewing the report portion 88. Therefore, an information provision apparatus for a vehicle capable of providing information that fits the situation of the vehicle to the rider can be provided.

Further, the present embodiment is provided with a vehicle instrument 10 which includes the report means 77 for reporting various types of information including vehicle information to the rider, and the control means 74 for operating the report means 77, and is connected to the portable terminal 20 via the connecting means C. The report means 77 has a display device 41 for displaying various types of information. Upon receiving a manipulation input signal indicating that a start switch of the vehicle is turned on, when it is determined that a communication connection is not established, the control means 74 operates the display device 41 to display various types of information (for example, the vehicle speed display portion 81) and, when it is determined that the communication connection is established, the control means 74 operates the report means 77 to display external information of the vehicle (the navigation display portion 89) sent from the portable terminal 20 via the connecting means C in the variable display area R2 which is the predetermined position of the display device 41.

Therefore, at a time at which the external information of the vehicle (the navigation display portion 89) is displayed in the variable display area R2, the rider can know intuitively that the portable terminal 20 is connected to the vehicle instrument 10 via the connecting means C to be communicable in a wireless manner. Therefore, an information provision apparatus for a vehicle capable of providing information that fits the situation of the vehicle to the rider can be provided.

(Second Embodiment)

Next, a second embodiment of the present invention will be described with reference to FIGS. 7 to 9. The same or equivalent components as those of the above-described first embodiment are denoted by the same reference numerals and detailed description thereof is omitted. In the second embodiment, the pointer type display portion 30 which displays vehicle information employed in the first embodiment functions also as a part of the report means 77. The remaining time after the start switch is turned on until a communication connection between the vehicle instrument 10 and the portable terminal 20 is established is displayed in a countdown manner using the pointer type display portion 30. Therefore, the report means 77 in the second embodiment is provided with a display device 41, a sounding body 76, and the pointer type display portion 30.

Figure 7:
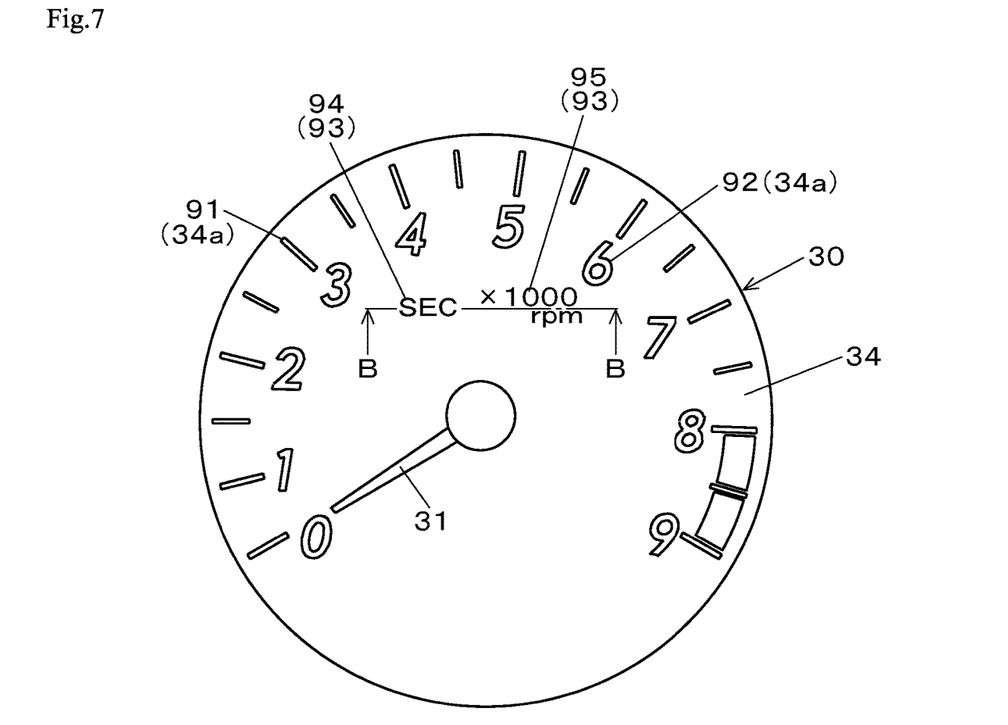
FIG. 7 is a front view of a pointer type display portion according to a second embodiment of the present invention.

FIG. 7 is a front view of the pointer type display portion 30 in the second embodiment. In this case, the measurement value display portion 34 provided in the pointer type display portion 30 has a scale portion 91 arranged circularly, a numeric portion 92 arranged circularly along an inner side of the scale portion 91, and a unit display portion 93 located slightly above the central portion of the display plate 34.

The unit display portion 34 is provided with a first unit display portion 94 of "SEC" indicating "seconds" which is the unit of the remaining time and a second unit display portion 95 of "×1000 rpm" indicating the unit of engine revolutions of the vehicle. These unit display portions 94 and 95 are printed on an optically transparent substrate (not illustrated) which is a base material of the display plate 34.

Figure 8:
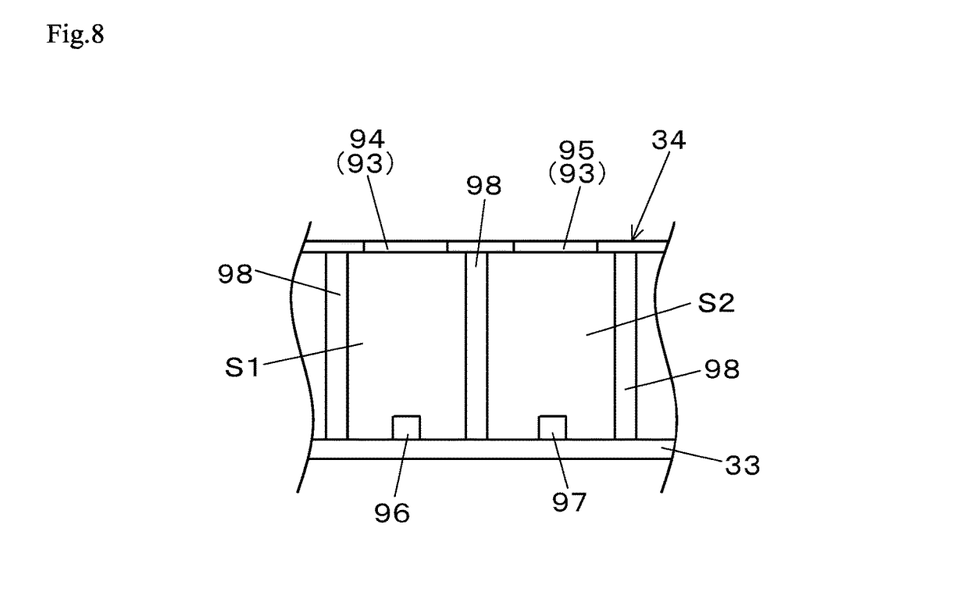
FIG. 8 is a cross-sectional view along line B-B of FIG. 7.

As illustrated in FIG. 8, a first light source 96 corresponding to the first unit display portion 94 and a second light source 97 corresponding to the second unit display portion 95 are disposed (mounted) on the wiring substrate 33 located immediately below the unit display portion 34. Each of the light sources 96 and 97 consists of a chip type light emitting diode which suitably generates color, and is turned on under the control of the control means 74.

In FIG. 8, the reference numeral 98 denotes a partition wall portion located between the wiring substrate 33 and the display plate 34. In this case, a pair of first and second illumination spaces S1 and S2 are formed by the partition wall portion 98. The partition wall portion 98 may be formed integrally with the case body 36, or may be made separately from the case body 36.

The first illumination space S1 is provided to correspond to the first unit display portion 94 and the first light source 96. Illumination light emitted from the first light source 96 upon turning on of the first light source 96 is guided to the first unit display portion 94 through the first illumination space S1, whereby the first unit display portion 94 is displayed in luminescent light.

Similarly, the second illumination space S2 is provided corresponding to the second unit display portion 95 and the second light source 97. Illumination light emitted from the second light source 97 upon turning on of the second light source 97 is guided to the second unit display portion 95 through the second illumination space S2, whereby the second unit display portion 95 is displayed in luminescent light.

Next, a processing operation performed by the control means 74 provided in the vehicle instrument 10 in the second embodiment will be described.

First, upon receiving a manipulation input signal indicating that a start switch is turned on via the multiplex communication I/O terminal 72 (or the vehicle information terminal 71), when it is determined that the communication connection is not established, the control means 74 operates the display device 41 (the report means 77) to display the vehicle speed display portion 81, the residual fuel display portion 82, the mileage display portion 83, the time display portion 84, the traveling mode display portion 85, the fuel mileage display portion 86, the ambient temperature display portion 87, and the report portion 88 on the display device 41 as in the case of the first embodiment, and operates the pointer type display portion 30 (the report means 77) so that the rider (the user) can know the remaining time until the communication connection is established by reading contrast between the pointer 31 and the measurement value display portion 34a.

Then, as in the case of the first embodiment illustrated in FIG. 5, in the display device 41, the vehicle speed display portion 81, the fuel mileage display portion 82, the mileage display portion 83, and the time display portion 84 are displayed in the fixed display area R1, and the traveling mode display portion 85, the fuel mileage display portion 86, the ambient temperature display portion 87, and the report portion 88 are displayed in the variable display area R2.

At the same time with the display in the fixed display area R1 and the variable display area R2 in the display device 41, the control means 74 controls turning-on of each of the light sources 96 and 97 and operates the driving device 32 by predetermined arithmetic processing in the pointer type display portion 30.

Since the communication connection is not established (the first communication unit 78 is not started) under the control of the control means 74 at this time, only the first light source 96 of the light sources 96 and 97 is turned on and the first unit display portion 94 of "SEC" is displayed in luminescent light.

At the same time, the control means 74 operates the driving device 32 by the predetermined arithmetic processing so that the pointer 31 mounted on a rotary shaft of the driving device 32 is rotated on the display plate 34. Since the time until the communication connection is established is about 10 seconds as described above, when the time decreases from 10 seconds to 9 seconds, the pointer 31 performs a swing angle motion by the driving device 32 so that the pointer 31 indicates a numeric portion 92 corresponding to "9."

Figure 9:
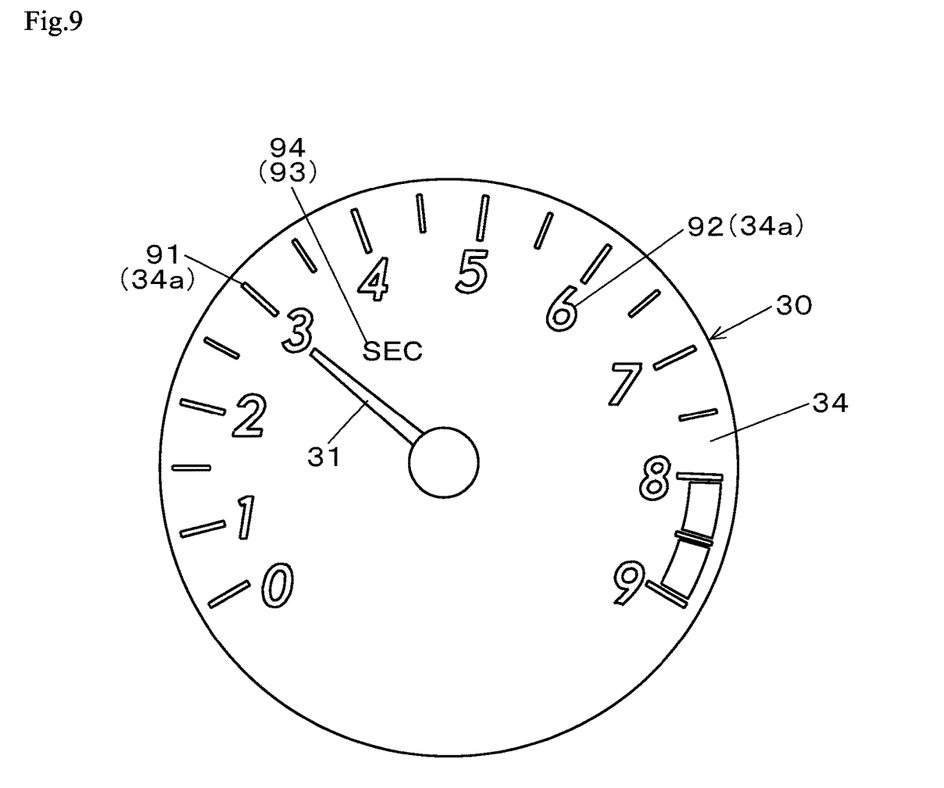
FIG. 9 is a front view of the pointer type display portion when a communication connection between a vehicle-mounted device and an external device according to the second embodiment is not established.

For example, in the state illustrated in FIG. 9, since the pointer 31 indicates the numeric portion 92 corresponding to "3" and the first unit display portion 94 of "SEC" is displayed in luminescent light, the rider can easily know that the remaining time is 3 seconds by reading contrast between the pointer 31 and the numeric portion 92 (the measurement value display portion 34a).

Next, when the remaining time becomes 0 seconds and it is determined that the communication connection is established (the first communication unit 78 is started), the control means 74 turns the first light source 96 off which has been turned on, and turns the second light source 97 on which has been turned off.

Although not illustrated in detail, if it is assumed that the vehicle is in an idling condition after the start switch is turned on, since the pointer 31 indicates the numeric portion 92 corresponding to "1" and the second unit display portion 95 of "×1000 rpm" is displayed in luminescent light when the second light source 97 is turned on, the rider can easily know that the engine revolutions of the vehicle during idling is 1000 rpm by reading contrast between the pointer 31 and the numeric portion 92 (the measurement value display portion 34*a*). At this time, the navigation display portion 89 is displayed in the variable display area R2 under the control of the control means 74 as in the case of the first embodiment.

Therefore, according to the second embodiment, since the rider can know the remaining time after the start switch is turned on until the communication connection is completed (the first communication unit 78 is started) in detail by only viewing the pointer type display portion 30, it is possible to provide information that fits the situation of the vehicle and, since temporal transition of the remaining time is presented in a countdown manner by the rotation of the pointer 31, a novel and original appearance is realizable.

Although the report portion 88 of "portable terminal connected" is displayed at a part of the variable display area R2 during temporal transition of the remaining time using the pointer 31 in the second embodiment, the report portion 88 may be hidden as needed.

In the second embodiment, temporal transition of the remaining time is displayed using the pointer 31 and measurement value display portion 34*a*. Alternatively, for example, an image of a pointer instrument imitating the pointer type display portion 30 may be displayed on a free space of the variable display area R2 in the display device 41 under the control of the control means 74, and temporal transition of the remaining time may be displayed using the image of the pointer instrument. In this case, the rider can know the remaining time by reading contrast between a pointer image imitating the pointer provided in the pointer instrument image and an image of a measurement value imitating the measurement value display portion provided in the pointer instrument image.

In each of the embodiments described above, an example in which the report portion 88 of "portable terminal connected" indicating that the communication connection is not established is displayed at a part of the variable display area R2 in the display device 41. Alternatively, for example, the sounding body 76 may be driven to output sound of "portable terminal connected" to the rider from the sounding body 76 under the control of the control means 74. It is possible to further improve attention-calling property by using both the report display by the report portion 88 and the voice. When it is determined that the communication connection is established, sound of "portable terminal has been connected" may be output to the rider from the sounding body 76 under the control of the control means 74.

(Third Embodiment)

Figure 10:
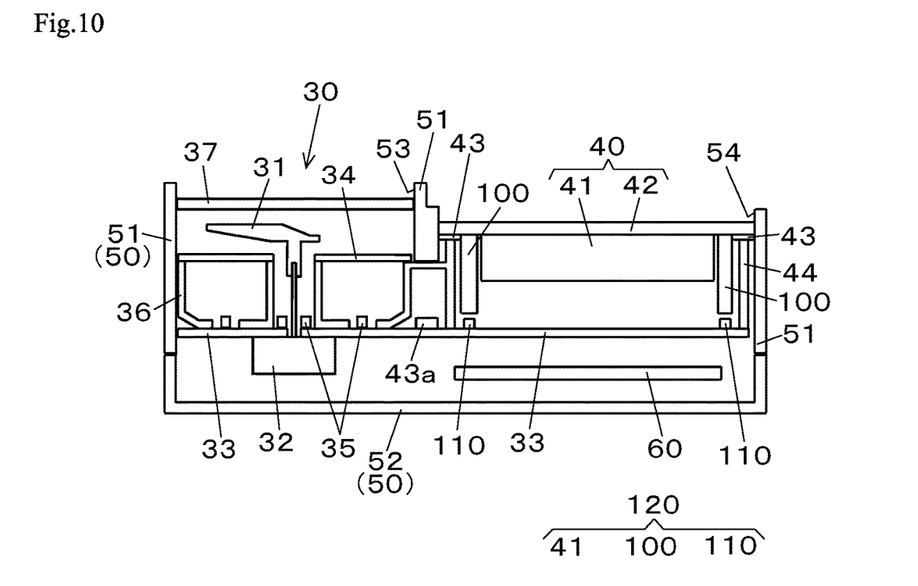
FIG. 10 is a cross-sectional view of a vehicle instrument according to a third embodiment of the present invention.

Next, a third embodiment of the present invention will be described with reference to FIGS. 10 to 12. The same or equivalent components as those of the above-described first and second embodiments are denoted by the same reference numerals and detailed description thereof is omitted. In the third embodiment, with the basic configuration of the first embodiment, a substantially frame-shaped translucent member 100 is disposed to surround (enclose) the display device 41 and a luminous body 110 is mounted (disposed) on the wiring substrate 33 to face a lower end portion of the translucent member 100.

In the third embodiment, the report means 120 is constituted by the display device 41 which displays various types of information, the translucent member 100 disposed to enclose the display portion 41, and the luminous body 110 which supplies illumination light of predetermined color to the translucent member 100.

The translucent member 100 is formed by a light transmissive synthetic resin material, and emits light in predetermined color upon receiving illumination light emitted from the luminous body 110.

The luminous body 110 consists, for example, of light emitting diode formed by packaged three bare chips emitting light of RGB three primary colors covered with transparent resin. A plurality of luminous bodies 110 are mounted on the wiring substrate 33 to face the lower end portion of the translucent member 100. The plurality of the luminous bodies 110 are desirably mounted on the wiring substrate 33 so that emission unevenness of the translucent member 100 may not occur as much as possible during light emission of the translucent member 100.

Next, a processing operation performed by the control means 74 in the third embodiment will be described.

Figure 11:
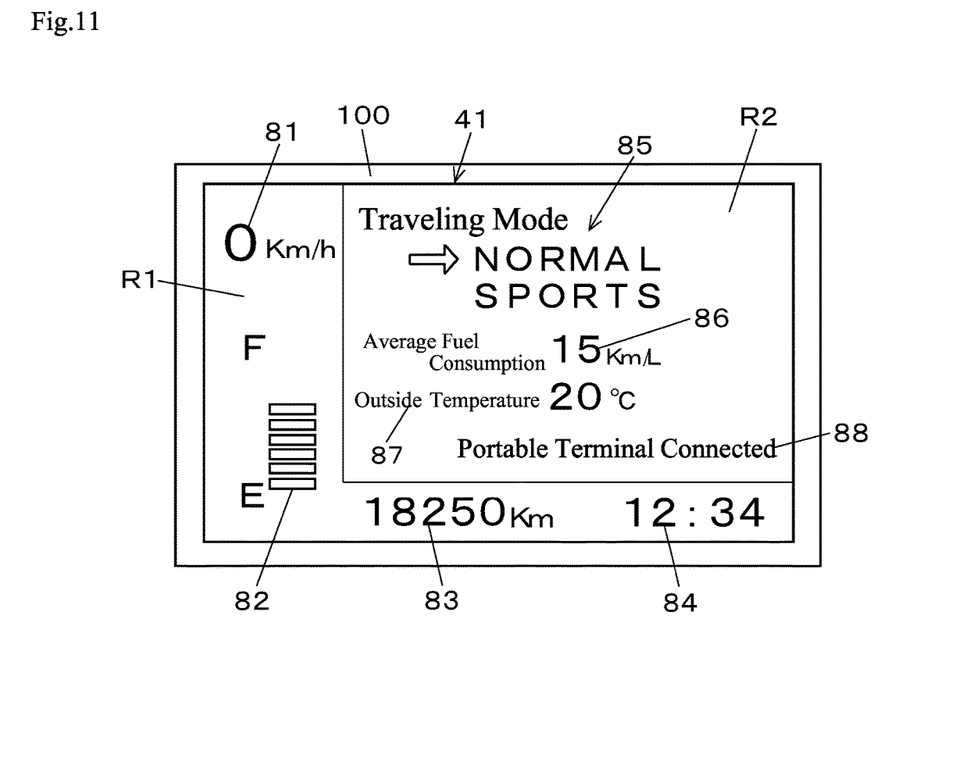
FIG. 11 is a front view of a display portion when a communication connection according to the third embodiment is not established.

First, upon receiving a manipulation input signal indicating that the start switch is turned on via the multiplex communication I/O terminal 72 (or the vehicle information terminal 71), the control means 74 operates the display device 41 to display vehicle information (vehicle situation information) as illustrated in FIG. 11 based on the manipulation input signal on the display device 41, and operates the display device 41 and the luminous body 110 in order to report to the rider that the communication connection is not established until the communication connection is established between the vehicle instrument 10 and the portable terminal 20.

FIG. 11 illustrates an example of display information displayed on the display device 41 when the start switch is turned on but the communication connection is not established. As in the case of the first embodiment, the vehicle speed display portion 81, the fuel mileage display portion 82, the mileage display portion 83, and the time display portion 84 are displayed in the fixed display area R1, and other display information, i.e., the traveling mode display portion 85, the fuel mileage display portion 86, and the ambient temperature display portion 87 is displayed in the variable display area R2.

When it is determined that the communication connection is not established (the first communication unit 78 has not started), the control means 74 operates the display device 41 to display in order to report to the rider that the communication connection is not established, and turns each of the luminous bodies 110 on. Then, the report portion 88 of "portable terminal connected" is displayed below the ambient temperature display portion 87 in the variable display area R2 of the display device 41, and the translucent member 110 provided to enclose the display device 41 emits light in, for example, yellow.

Therefore, the rider can obtain the same operation and effect as those of the first embodiment by viewing the report portion 88 of "portable terminal connected" through the second see-through portion 42 and the translucent member 100 emitting light in yellow. Further, the rider can know more reliably that the communication connection is not established based on a color tone change in the translucent member 100 with higher eye attractiveness.

Figure 12:
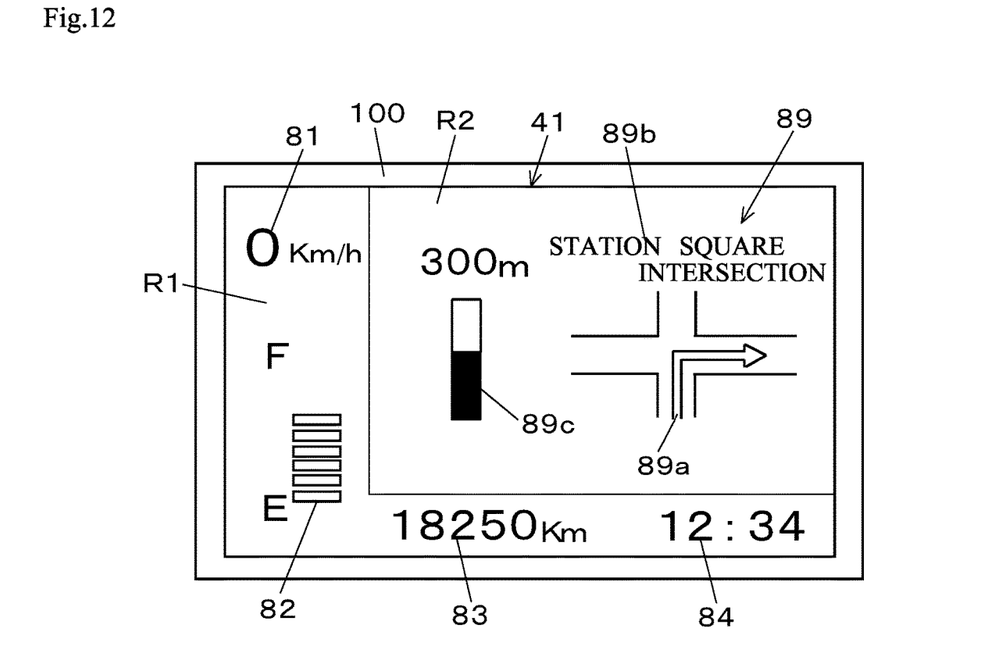
FIG. 12 is a front view of the display portion when a communication connection according to the third embodiment is established.

Next, when 10 seconds or more elapsed after the start switch is turned on and it is determined that the communication connection is established, the control means 74 receives the manipulation input signal via the multiplex communication I/O terminal 72 (or the vehicle information terminal 71), receives external information of the vehicle (the navigation information) sent from the portable terminal 20 via each of the communication units 78 and 23, operates the display device 41 to display the vehicle information and the navigation information as illustrated in FIG. 12 on the display device 41, and turns each of the luminous bodies 110 on in order to report to the rider that the communication connection is established.

Then, as illustrated in FIG. 12, regarding the information displayed in the fixed display area R1, the vehicle speed display portion 81, the fuel mileage display portion 82, the mileage display portion 83, and the time display portion 84 are continuously displayed regardless of the establishment of the communication connection, whereas regarding the display in the variable display area R2, upon establishment of the communication connection (upon start-up of the first communication unit 78), the display information constituted by the traveling mode display portion 85, the fuel mileage display portion 86, the ambient temperature display portion 87, and the report portion 88 is changed to the navigation display portion 89 which is the navigation information, and the translucent member 110 provided to enclose the display device 41 emits light not in yellow but in, for example, green.

Therefore, by viewing the translucent member 100 emitting light in green through the second see-through portion 42, the rider can know more reliably that the communication connection is established based on the color tone change from yellow to green of the translucent member 100 with high eye attractiveness.

In the third embodiment, an example in which the translucent member 100 emits light in yellow by turning on each of the luminous bodies 110 in yellow when the communication connection is not established, and the translucent member 100 emits light in green by turning on each of the luminous bodies 110 in green when the communication connection is established is described. Alternatively, the control means 74 may, for example, control each of the luminous bodies 110 to blink so that the translucent member 100 blinks in yellow or green.

An example in which color of emitted light of the translucent member 100 is changed depending on whether the communication connection is established is described in the third embodiment. Alternatively, for example, when communication between the vehicle instrument 10 and the portable terminal 20 breaks down due to a certain cause after establishment of the communication connection (for example, when the control means 74 receives a signal indicating that battery of the portable terminal 20 has run out), each of the luminous bodies 110 may be turned on (or made to blink) in red under the control of the control means 74, whereby the translucent member 100 may emit light (blink) in red.

In the third embodiment, an example in which, when the communication connection is established and the navigation display portion 89 is displayed in the variable display area R2, the color of emitted light of the translucent member 100 is set to green is described. Alternatively, for example, when the communication connection is established and incoming call information is displayed in the variable display area R2, the color of emitted light of the translucent member 100 may be set to a color different from green (for example, blue).

The color of emitted light of the translucent member 100 may be changed freely depending on the preference of the rider using a switch operation portion (not illustrated) for changing color tone provided at a suitable position of the vehicle.

Each of the luminous bodies 110 may be turned off depending on the content (type) of the external information of the vehicle displayed in the variable display area R2 when the communication connection is established. In particular, for example, when the navigation display portion 89 is displayed in the variable display area R2, the color of emitted light of the translucent member 100 may be set to green by turning on each of the luminous bodies 110 in green and, when the incoming call information is displayed in the variable display area R2, the translucent member 100 may be set not to emit light by turning each of the luminous bodies 110 into a non-light-emitting state.

Although an example in which the vehicle instrument 10 is connected to the portable terminal 20 via the connecting means C (each of the communication units 78 and 23) consisting of the wireless communication means is described in each of the embodiments described above, the connecting means is not limited to the same. The vehicle instrument 10 and the portable terminal 20 may be connected using, for example, the connecting means C consisting of a wired connection means, such as a USB.

INDUSTRIAL APPLICABILITY

The present invention is applicable to an information provision apparatus for a vehicle provided with a vehicle-mounted device, such as a vehicle instrument, which includes a report means for reporting various types of information including vehicle information, and a control means for operating the report means, and is connected to an external device (a portable terminal) via a connection means.

DESCRIPTION OF REFERENCE NUMERALS 10 vehicle instrument (vehicle-mounted device)
20 portable terminal (external device)
23 second communication unit
30 pointer type display portion
31 pointer
34 display plate
34a measurement value display portion
40 display unit
41 display device (display portion)
74 control means
76 sounding body
77, 120 report means
78 first communication unit
88 report portion
89 navigation display portion (external information of vehicle)
92 numeric portion
93 unit display portion
94 first unit display portion
95 second unit display portion
96 first light source
97 second light source
100 translucent member
110 luminous body
C connection means

The invention claimed is:
1. An information provision apparatus for a vehicle, comprising:

a vehicle-mounted device that includes:
- a report means for reporting various types of information including vehicle information to a user; and
- a control unit for operating the report means, wherein the vehicle-mounted device is connected to an external device via a connection means, the report means includes at least a display unit for displaying the various types of information, the display unit includes a fixed display area capable of being displayed at a predetermined display position and a variable display area which is a remaining display area of the display unit other than the fixed display area, upon receiving a manipulation input signal indicating that a start switch of the vehicle is turned on, the control unit operates the display unit to display, at the variable display area of the display unit, information to report to the user that a communication connection between the vehicle-mounted device and the external device is not established, until the communication connection is established, and when the display unit is on, information displayed in the fixed display area of the display unit is a same content.

2. An information provision apparatus for a vehicle, comprising:

a vehicle-mounted device that includes:
- a report means for reporting various types of information including vehicle information to a user; and
- a control unit for operating the report means, wherein the vehicle-mounted device is connected to an external device via a connection means, the report means includes at least a display unit for displaying the various types of information, the display unit includes a fixed display area capable of being displayed at a predetermined display position and a variable display area which is a remaining display area of the display unit other than the fixed display area, upon receiving a manipulation input signal indicating that a start switch of the vehicle is turned on, the control unit makes the various types of information be displayed on the display unit when it is determined that the communication connection between the vehicle-mounted device and the external device is not established, and the control unit operates the display unit to display, at the variable display area of the display unit, external information of a vehicle sent from the external device via the connection means when it is determined that the communication connection is established, and when the display unit is on, information displayed in the fixed display area of the display unit is a same content.

3. The information provision apparatus for a vehicle according to claim 1, wherein the report means is provided at least with a pointer type display portion which displays the vehicle information, the pointer type display portion includes a pointer extending linearly and a display plate having a measurement value display portion indicated by the pointer, and the control unit operates the report means so that the user can know remaining time until the communication connection is established by reading contrast between the pointer and the measurement value display portion.

4. The information provision apparatus for a vehicle according to claim 1, wherein the report means includes the display unit which displays the various types of information, a translucent member disposed to enclose the display unit and a light source supplying illumination light of predetermined color to the translucent member, and the control unit turns on the light source or makes the light source blink in order to report to the user that the communication connection is not established until the communication connection is established.

5. The information provision apparatus for a vehicle according to claim 2, wherein the report means includes a translucent member disposed to enclose the display unit and a light source supplying illumination light of predetermined color to the translucent member, and when it is determined that the communication connection is established, the control unit turns on the light source or makes the light source blink in order to report to the user that the communication connection is established.

6. The information provision apparatus for a vehicle according to claim 2, wherein the report means is provided at least with a pointer type display portion which displays the vehicle information, the pointer type display portion includes a pointer extending linearly and a display plate having a measurement value display portion indicated by the pointer, and the control unit operates the report means so that the user can know remaining time until the communication connection is established by reading contrast between the pointer and the measurement value display portion.

* * * * *